(12) United States Patent
Cetinkaya

(10) Patent No.: US 8,930,105 B2
(45) Date of Patent: Jan. 6, 2015

(54) METHOD FOR SETTING A BRAKE SYSTEM OF A VEHICLE IN THE EVENT OF A COLLISION

(75) Inventor: Ferah Cetinkaya, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 12/998,333

(22) PCT Filed: Aug. 26, 2009

(86) PCT No.: PCT/EP2009/060986
§ 371 (c)(1),
(2), (4) Date: Jun. 15, 2011

(87) PCT Pub. No.: WO2010/046161
PCT Pub. Date: Apr. 29, 2010

(65) Prior Publication Data
US 2011/0264347 A1 Oct. 27, 2011

(30) Foreign Application Priority Data
Oct. 20, 2008 (DE) .......................... 10 2008 042 963

(51) Int. Cl.
*B60T 8/1755* (2006.01)
*B60T 7/22* (2006.01)
(52) U.S. Cl.
CPC ............. *B60T 7/22* (2013.01); *B60T 2201/024* (2013.01)
USPC ................. 701/70; 701/45; 701/46; 701/301; 303/138; 303/191; 303/193; 180/274; 180/275

(58) Field of Classification Search
CPC ............ B60T 2201/022; B60T 8/1755; B60R 2021/01259; B60R 21/013; B60R 16/0315; B60G 17/0195; B60W 10/06; B60W 10/20
USPC ........... 701/70, 45, 41, 37, 301, 93, 46, 38, 1; 74/512, 560; 180/274, 275, 282; 280/734, 735; 303/191, 193, 81, 125, 303/138; 340/435, 479, 903; 382/104
See application file for complete search history.

(56) References Cited

U.S. PATENT DOCUMENTS

| 3,778,826 | A * | 12/1973 | Flannery et al. | 342/71 |
| 5,530,651 | A * | 6/1996 | Uemura et al. | 701/301 |
| 6,105,705 | A * | 8/2000 | Faye | 180/275 |
| 6,267,194 | B1 * | 7/2001 | Bullinger et al. | 180/275 |
| 6,364,433 | B1 * | 4/2002 | Stemer | 303/138 |
| 2004/0030497 | A1 * | 2/2004 | Knoop et al. | 701/301 |
| 2004/0102901 | A1 * | 5/2004 | Altan et al. | 701/301 |
| 2005/0052077 | A1 * | 3/2005 | Quirant et al. | 303/115.2 |
| 2007/0131468 | A1 * | 6/2007 | Bullinger et al. | 180/282 |
| 2009/0299578 | A1 * | 12/2009 | Lucas et al. | 701/46 |

FOREIGN PATENT DOCUMENTS

| DE | 197 53 971 | 6/1999 |
| DE | 10 2005 059 903 | 6/2007 |
| EP | 0 967 121 | 12/1999 |

(Continued)

*Primary Examiner* — Helal A Algahaim
*Assistant Examiner* — Jelani Smith
(74) *Attorney, Agent, or Firm* — Kenyon & Kenyon LLP

(57) ABSTRACT

In a method for setting a brake system of a vehicle, braking force is built up automatically in the event of a collision. In the process, the position of the collision on the vehicle is determined and the build-up of braking force is implemented as a function of the position of the collision.

15 Claims, 2 Drawing Sheets

(56) References Cited

FOREIGN PATENT DOCUMENTS

| | | |
|---|---|---|
| EP | 1 369 327 | 12/2003 |
| JP | 11-235969 | 8/1999 |
| JP | 2000-219111 | 8/2000 |
| JP | 2002-316629 | 10/2002 |
| JP | 2004-9892 | 1/2004 |
| JP | 2005-254945 | 9/2005 |
| JP | 2006-510519 | 3/2006 |
| JP | 2007-304069 | 11/2007 |
| JP | 2008-100603 | 5/2008 |
| JP | 2008-537920 | 10/2008 |
| WO | WO 2004/080771 | 9/2004 |

* cited by examiner

METHOD FOR SETTING A BRAKE SYSTEM OF A VEHICLE IN THE EVENT OF A COLLISION

BACKGROUND OF THE INVENTION

1. Field of the Invention

The present invention relates to a method for setting a brake system of a vehicle in which in the event of a collision braking force is automatically built up.

2. Description of Related Art

Published German patent application document DE 197 53 971 A1 describes a method for controlling a brake system of a vehicle, in which in the event of a collision between the vehicle and another vehicle, a braking force that is greater than the braking force specified by the driver by activating the brake pedal and/or a parking brake is built up at the wheel brakes. This initiates an automatic braking process having very high braking force, which in the event of a collision guarantees that the vehicle remains securely at a standstill or comes to a standstill within a short time. By this means, consequential damage of an accident and the risk of further accidents may be reduced. For example, the position of a vehicle standing at an intersection, which is struck in the rear section by another vehicle, may be maintained or at least the displacement path of the vehicle may be kept short.

BRIEF SUMMARY OF THE INVENTION

The present invention is based on the objective of automatically building up braking force in a vehicle in the event of a collision in such a way that the consequences of the accident are reduced.

In the method according to the present invention for setting a brake system in a vehicle, in the event that a vehicle collides with a third vehicle or with another object, a braking force is built up automatically, namely in general independently of whether the driver activates the vehicle brake or not. By this means, in spite of the impulse or the recoil transmitted to the vehicle during the collision, the displacing movement is reduced relative to the ground, which results in a reduction of the accident severity and helps to avoid secondary accidents in a plurality of accident situations.

In order to be able to react more specifically to the type of collision, according to the present invention first the position of the collision on the vehicle is determined, and then a braking force of variable magnitude or an adjusted increase in the braking force is automatically implemented, according to the type of collision. Regarding the position of the collision on the vehicle, in particular a distinction is made between a frontal impact, a rear impact, or a side impact, with a distinction between the left side/right side, and the automatic build-up of the braking force is controlled accordingly. Options include influencing the gradient of the braking force build-up and the braking force maximum to be reached, and possibly also an idle time, that is, a delay in the build-up of the braking force. Using these measures, it is possible to react flexibly to the type of collision, and different reactions can be implemented depending on the collision type, in order to reduce the severity of the consequences of the accident.

For example, in the event of a collision in the front section, it can be expedient to decelerate the vehicle as quickly as possible in order to keep the uncontrolled displacing movement of the vehicle, which results from the impulse of the collision, as short as possible. In the event that the vehicle is decelerated as quickly as possible, in particular a high gradient is sought in the build-up of braking force and apart from this a smallest possible delay between the commencement of the collision and the beginning of the braking force build-up. In order to keep this idle time or delay as short as possible, it may be expedient to bring the braking unit of the brake system, which is directly responsible for the vehicle deceleration, into a ready position as quickly as possible in the event of collisions. In the event of a hydraulic embodiment of the braking unit, for example, as a hydraulic or electrohydraulic brake, the braking unit is prefilled with the hydraulic medium. This takes place preferably immediately after a collision is determined on the vehicle, the ready position of the braking unit being set, possibly with the aid of the vehicle sensor system, even already shortly before the onset of the collision, if it follows from the sensor information that a collision is immediately impending. This occurs, for example, through the evaluation of information from optical sensors, from radar or lidar sensors or from ultrasound sensors, with the aid of which the collision, which is immediately impending or has already occurred, and in particular also the position of the collision on the vehicle may be detected.

The evaluation of the triggering of the airbag in the vehicle provides an additional possibility for determining the position of the collision on the vehicle. Since airbags are distributed in the vehicle at different positions, the position of the collision on the vehicle may be inferred from the triggering of the corresponding airbag. For example, if an airbag integrated into the dashboard or the steering wheel is triggered, this indicates a collision in the front or lateral front section of the vehicle. Accordingly, measures for the automatic build-up of the braking force can be taken, such as the quickest possible deceleration of the vehicle already mentioned, that is, with the shortest possible idle time and with a high gradient. On the other hand, if a collision is detected in the rear section, the vehicle can be decelerated with a temporal delay in order to ensure that following traffic has the option of evading ahead of the accident site. However, in principle it is also possible to decelerate immediately even in the event of a collision in the rear section, and to implement a delayed braking in the event of a collision in the front section, this being in particular a function of additional information about the current traffic situation, for example, the position of the accident vehicle in front of or after an intersection.

Furthermore, it may be expedient to design the method in such a way that the automatic build-up of the braking force can be overridden, that is, suspended, by a precisely defined reaction of the driver. This may be, for example, the activation of the acceleration pedal by the driver, or a strong activation of the brake pedal by the driver, so that the driver reaction generates a braking force that reaches at least the same level as the braking force in the automatic build-up.

The method according to the present invention can be used for different brake types. Hydraulic brake systems, electrohydraulic brakes, electromotive brakes or possibly also electropneumatic brake systems are possibilities. The brake system that is used to implement the method according to the present invention is preferably equipped with a regulation and control device in which the method runs. This may be an ESP control device (electronic stability program), for example, with whose help the vehicle dynamics controls may be implemented by intervening in the brakes and possibly also in the engine management. The regulation and control device receives signals from sensors, from which a collision that has actually occurred or is immediately imminent can be derived, for example, airbag signals or sensor signals of a surroundings sensor system such as radar, lidar, optical sensors, or ultrasound sensors. In the regulation and control device, after the evaluation of the input signals, actuating signals are generated, which are applied to the brake system for the desired build-up of braking force.

BRIEF DESCRIPTION OF THE DRAWINGS

Further advantages and useful embodiments may be gathered from the following Detailed Description and Drawings, wherein.

DETAILED DESCRIPTION OF THE INVENTION

Figure 1:
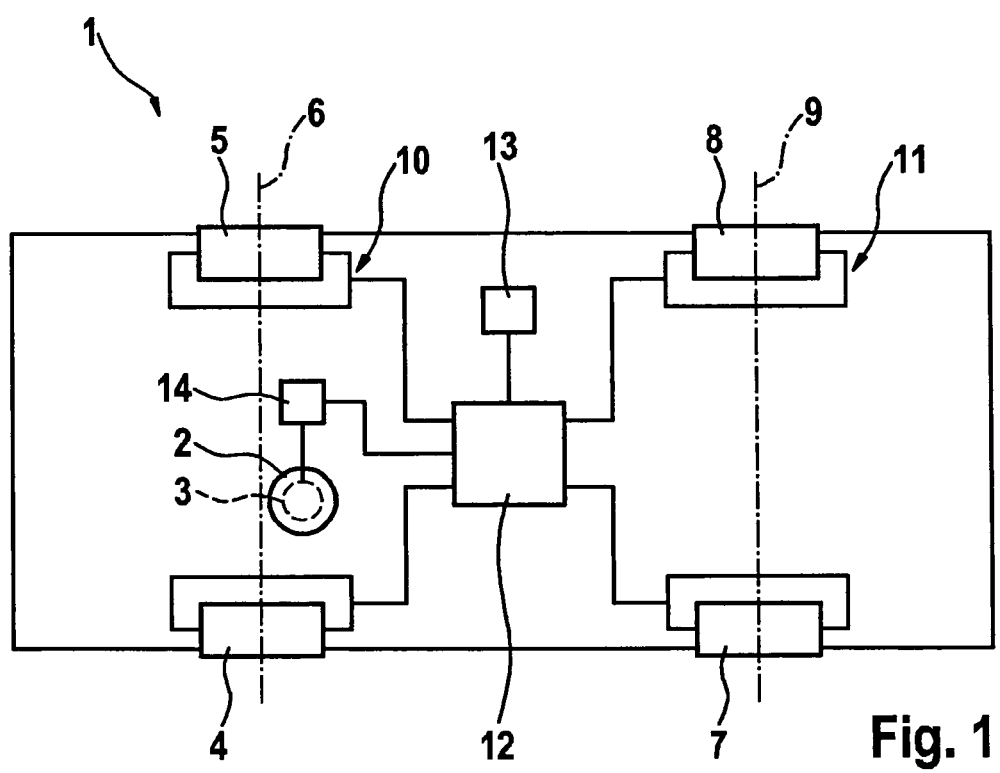
FIG. 1 shows in a schematic illustration, a motor vehicle, which is equipped with front and rear braking devices and with a regulation and control device for setting the braking devices.

Vehicle 1 illustrated in FIG. 1 is preferably a motor vehicle that is to be controlled via a steering handle implemented as a steering wheel 2. Motor vehicle 1 has a front braking device 10 and a rear braking device 11, the front braking device 10 acting on front wheels 4 and 5 situated on front axle 6, and rear braking device 11 acting on rear wheels 7 and 8 situated on rear axle 9. The braking units of braking devices 10 and 11 are designed as hydraulic brakes, electrohydraulic brakes, or electromotive brakes. Braking devices 10 and 11 are set via actuating signals of a regulation and control device 12, which may possibly be an ESP control device. For the generation of actuating signals to apply to braking devices 10 and 11, regulation and control device 12 processes sensor signals that come from a sensor system 13, it being possible to determine via sensor system 13 vehicle state variables that characterize the longitudinal and/or transverse dynamics of the vehicle, such as, for example, the vehicle longitudinal speed, the longitudinal acceleration, the transverse acceleration, or the yaw rate. Sensor system 13 may also contain a surroundings sensor system, with which the events in the surroundings of vehicle 1 may be determined, for example, the distance and the relative speed compared to a preceding vehicle. The surroundings sensor system includes radar-supported sensors, optical sensors, or ultrasound sensors, for example.

An airbag 3 whose functioning is able to be controlled via an airbag control device 14 is integrated into steering wheel 2. Airbag control device 14 is preferably connected to regulation and control device 12 via a CAN data bus, in order to allow for a data exchange.

Additional airbags may be present in vehicle 1, which are likewise to be triggered via actuating signals of airbag control device 14.

In the event of a collision of the vehicle, braking force is built up via the braking devices automatically, which takes place independently of the activation of the brake pedal by the driver, so that the braking force build-up is implemented even in the event that the driver does not activate the brake pedal. In the event that the brake pedal is activated by the driver, a check is advantageously performed to see whether the pedal activation suffices to provide the optimal braking force for the respective situation. If this is not the case, then it is possible to set the desired braking force level via the automatic braking force build-up.

Figure 2:
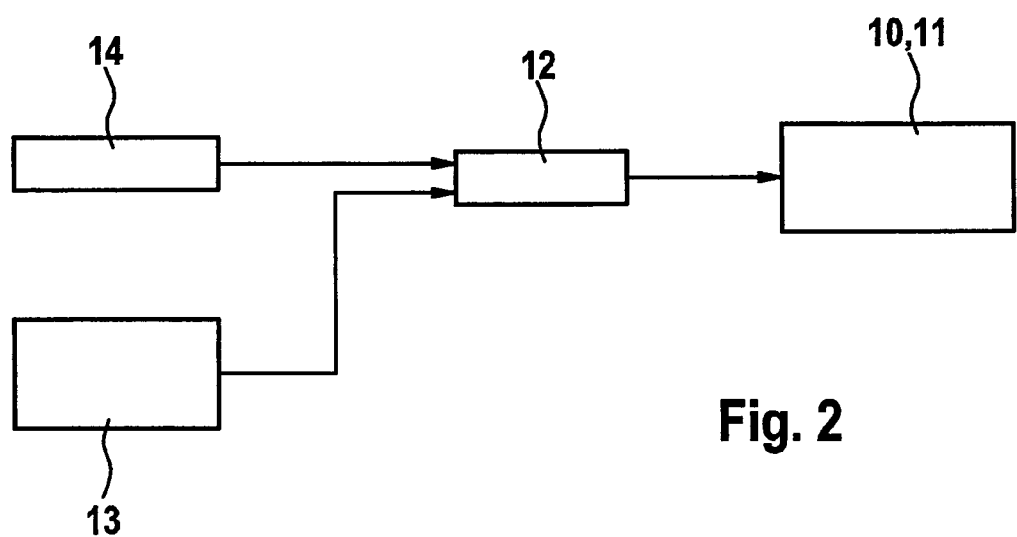
FIG. 2 shows in a block illustration, the interaction of different regulation and control devices and the brake system in the vehicle.

The automatic braking force build-up takes place in the event of a collision, it being possible to provide a hydraulic braking pressure or even for a braking pressure build-up to take place already shortly before the onset of the collision. The collision is communicated to regulation and control device 12, which is responsible for the setting of the braking devices, via a triggering of the airbags, for example. As can be seen in FIG. 2, regulation and control device 12 obtains the information about the airbag triggering from airbag control device 14. Additionally or alternatively, information from sensor system 13 is also provided to regulation and control device 12, from which an immediately impending or already occurred collision may be derived. In regulation and control device 12, actuating signals to be applied to braking devices 10 and 11 are generated in view of the signals that have come in.

In order to reduce the severity of the consequences of the accident, not only the information about the collision is provided, but also additionally the position of the collision on the vehicle is ascertained. By taking into account the type of accident, for example, a rear impact, a frontal impact, or a lateral impact, it is possible to influence the automatic braking force build-up, namely both with regard to the beginning of the braking force build-up (idle time), the gradient of the braking force build-up, and the maximum level of the braking force achievable. These parameters relating to the braking force build-up are set according to the type of collision with the objective of keeping the consequences of the accident as slight as possible.

What is claimed is:

1. A method for setting a brake system of a vehicle in which in the event of a collision, a braking force is built up automatically, the method comprising: determining a position of the collision on the vehicle based on an evaluation of a triggering of at least one airbag in the vehicle, wherein the position of the collision on the vehicle is a location on the vehicle where it is impacted; and implementing an automatic build-up of the braking force as a function of the position of the collision, wherein in the event of a collision in a rear section of the vehicle the vehicle is immediately decelerated, and wherein in the event of a collision in a front section of the vehicle a delayed braking is implemented; wherein the type of collision is taken into account, including a rear impact, a frontal impact, and a lateral impact, to influence the automatic braking force build-up or idle time with regard to the beginning of the braking force build-up, a gradient of the braking force build-up, and a maximum achievable level of the braking force, wherein the automatically built-up braking force can be suspended through a reaction of a driver, and wherein the reaction of the driver is activation of the acceleration pedal, and wherein parameters relating to the braking force build-up are set according to the type of collision.

2. The method as recited in claim 1, wherein the gradient of the braking force build-up is influenced as a function of the position of the collision.

3. The method as recited in claim 1, wherein the braking force build-up takes place in a delayed manner.

4. The method as recited in claim 3, wherein the delayed manner is influenced as a function of the position of the collision.

5. The method as recited in claim 1, wherein the braking force build-up takes place in an accelerated manner via pre-filling of a braking unit with hydraulic medium.

6. The method as recited in claim 1, wherein the braking force maximum is influenced as a function of the position of the collision.

7. The method as recited in claim 1, wherein the position of the collision is determined via a surroundings sensor system.

8. The method as recited in claim 7, wherein the surroundings sensor system is optical sensors, radar or ultrasound sensors.

9. The method as recited in claim 1, wherein in the event of a collision in the front section of the vehicle the delayed braking is implemented after the collision in the front section.

10. The method as recited in claim 7, wherein the surroundings sensor system determines the position of the collision before the event of the collision.

11. The method as recited in claim 1, wherein the braking force build-up takes place as a function of a current traffic situation.

12. A control device for setting a brake system of a vehicle in which in the event of a collision, a braking force is built up automatically, comprising: a determining arrangement to determine a position of the collision on the vehicle based on an evaluation of a triggering of at least one airbag in the vehicle; and an implementing arrangement to implement an automatic build-up of the braking force as a function of the position of the collision, wherein in the event of a collision in a rear section of the vehicle the vehicle is immediately decelerated, wherein in the event of a collision in a front section of the vehicle a delayed braking is implemented, and wherein the position of the collision on the vehicle is a location on the vehicle where it is impacted wherein the type of collision is taken into account, including a rear impact, a frontal impact, and a lateral impact, to influence the automatic braking force build-up or idle time with regard to the beginning of the braking force build-up, a gradient of the braking force build-up, and a maximum achievable level of the braking force, wherein the automatically built-up braking force can be suspended through a reaction of a driver, and wherein the reaction of the driver is activation of the acceleration pedal, and wherein parameters relating to the braking force build-up are set according to the type of collision.

13. A brake system, comprising: a control device for setting a brake system of a vehicle in which in the event of a collision, a braking force is built up automatically, including: a determining arrangement to determine a position of the collision on the vehicle based on an evaluation of a triggering of at least one airbag in the vehicle; and an implementing arrangement to implement an automatic build-up of the braking force as a function of the position of the collision, wherein in the event of a collision in a rear section of the vehicle the vehicle is immediately decelerated, wherein in the event of a collision in a front section of the vehicle a delayed braking is implemented, and wherein the position of the collision on the vehicle is a location on the vehicle where it is impacted; wherein the type of collision is taken into account, including a rear impact, a frontal impact, and a lateral impact, to influence the automatic braking force build-up or idle time with regard to the beginning of the braking force build-up, a gradient of the braking force build-up, and a maximum achievable level of the braking force, wherein the automatically built-up braking force can be suspended through a reaction of a driver, and wherein the reaction of the driver is activation of the acceleration pedal, and wherein parameters relating to the braking force build-up are set according to the type of collision.

14. The brake system as recited in claim 13, wherein the automatic build-up of braking force takes place via actuating signals of an ESP control device.

15. The brake system as recited in claim 13, further comprising:
an airbag control device for controlling a functioning of at least one airbag in the vehicle.

* * * * *